United States Patent
Sundararajan et al.

(10) Patent No.: US 12,273,267 B2
(45) Date of Patent: *Apr. 8, 2025

(54) SYMMETRIC NETWORKING FOR ORPHAN WORKLOADS IN CLOUD NETWORKS

(71) Applicant: Cisco Technology, Inc., San Jose, CA (US)

(72) Inventors: Balaji Sundararajan, Fremont, CA (US); Ramakumara Kariyappa, San Jose, CA (US); Nithin Bangalore Raju, San Jose, CA (US); Bhairav Dutia, Santa Clara, CA (US); Vivek Agarwal, Campbell, CA (US); Satish Mahadevan, San Ramon, CA (US); Ankur Bhargava, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/604,972

(22) Filed: Mar. 14, 2024

(65) Prior Publication Data

US 2024/0267325 A1    Aug. 8, 2024

Related U.S. Application Data

(62) Division of application No. 18/208,000, filed on Jun. 9, 2023, now Pat. No. 11,962,498.

(60) Provisional application No. 63/444,123, filed on Feb. 8, 2023.

(51) Int. Cl.
| | |
|---|---|
| *H04L 45/586* | (2022.01) |
| *H04L 45/748* | (2022.01) |
| *H04L 61/5061* | (2022.01) |

(52) U.S. Cl.
CPC .......... *H04L 45/586* (2013.01); *H04L 45/748* (2013.01); *H04L 61/5061* (2022.05)

(58) Field of Classification Search
CPC .............. H04L 45/586; H04L 61/5061; H04L 45/748
USPC ........................................................ 709/238
See application file for complete search history.

(56) References Cited

U.S. PATENT DOCUMENTS

| | | |
|---|---|---|
| 11,159,344 B1 | 10/2021 | Shevade et al. |
| 11,444,808 B1 | 9/2022 | Wei |
| 2016/0261486 A1 * | 9/2016 | Fang ........................ H04L 45/04 |
| 2021/0306261 A1 * | 9/2021 | Duan ........................ H04L 45/56 |
| 2022/0329459 A1 * | 10/2022 | Sundararajan ...... H04L 12/4666 |
| 2023/0096862 A1 * | 3/2023 | Wighe ................. H04L 63/0272 |
| | | 370/395.53 |

\* cited by examiner

*Primary Examiner* — Hermon Asres
(74) *Attorney, Agent, or Firm* — Lee & Hayes, P.C.

(57) ABSTRACT

Symmetric networking techniques disclosed herein can be applied by gateway routers in cloud networks. The techniques can ensure that both outbound traffic received at a cloud from a branch device and return traffic directed from the cloud back to the branch device are processed by a same gateway router. The gateway router can use network address translation to insert IP addresses from an inside pool and an outside pool assigned to the router.

17 Claims, 9 Drawing Sheets

SYMMETRIC NETWORKING FOR ORPHAN WORKLOADS IN CLOUD NETWORKS

CROSS REFERENCE TO RELATED APPLICATION

This application is divisional of and claims the benefit of U.S. patent application Ser. No. 18/208,000, filed Jun. 9, 2023, which claims the benefit of U.S. Provisional Application No. 63/444,123 filed Feb. 8, 2023, the contents of which are hereby incorporated herein by reference in their entirety.

TECHNICAL FIELD

The present disclosure relates generally to routing of network traffic via cloud networking equipment.

BACKGROUND

In cloud networking, network clients can reach cloud workloads through multiple different routers. The routers can be implemented, optionally along with other functions, as virtual hubs within the cloud. Each of the virtual hubs can receive and process network traffic from the network clients, and each of the virtual hubs can forward the network traffic to virtual networks within the cloud. The virtual networks host the cloud workloads.

The virtual hubs can be connected, e.g., in a full mesh topology. With a full mesh topology of virtual hubs, every virtual network in the cloud can be reachable through every virtual hub. Meanwhile, branches located outside the cloud can connect to the virtual hubs using, e.g., network virtual appliance (NVA), which can provide network functions such as virtual network function (VNF) or virtual private network (VPN).

Even though tens to hundreds of virtual hubs may participate in a full mesh topology, and the virtual hubs may connect to thousands of virtual networks, the branches are typically connected to a smaller group of local virtual hubs hosting NVAs. The branches receive route advertisements for all virtual networks through these local virtual hubs and traffic routes between the branches and cloud workloads can have equal path metrics.

When a branch initiates network traffic towards a destination server in a virtual network that hosts a cloud workload, the network traffic may enter the cloud through any one of the branch's connected virtual hubs. Furthermore, the return path from the cloud workload to the branch can exit the cloud through any one of the branch's connected virtual hubs.

In such scenarios, it is currently difficult or impossible to predict forward and return paths of the network traffic. As a result, some traffic flows can be asymmetric, i.e., the forward and return paths are different. When firewalls are enabled in the virtual hubs, such asymmetric traffic flows can cause problems such as undesirable transmission control protocol (TCP) session drops. Therefore, there is a need for techniques to implement symmetric traffic flows for network traffic flows that flow into and out of cloud networking environments.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
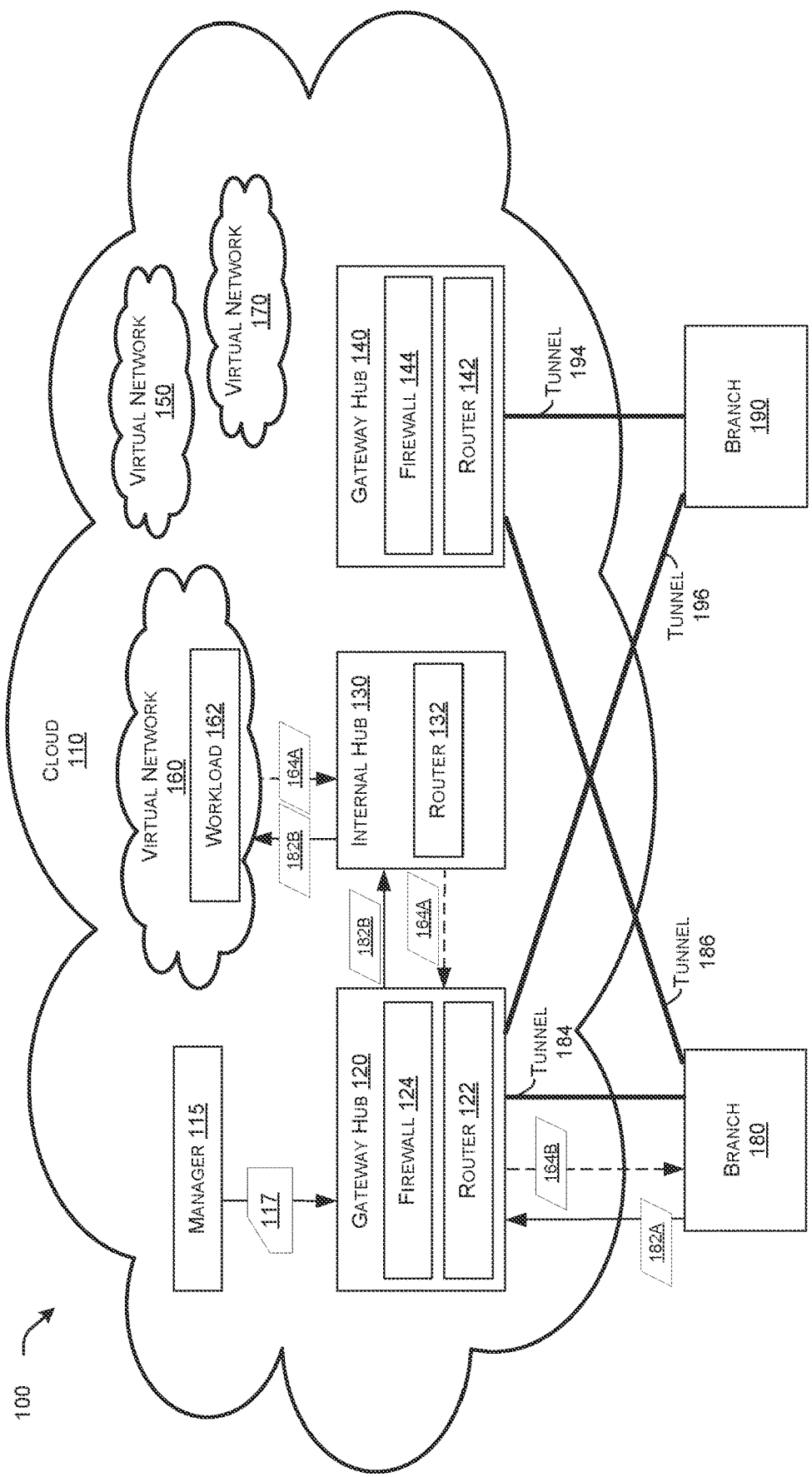
FIG. 1 illustrates an example system architecture comprising a cloud equipped with multiple gateway hubs, and multiple branches that communicate with the cloud via the gateway hubs, in accordance with various aspects of the technologies disclosed herein.

This disclosure describes techniques related to symmetric networking for orphan workloads in cloud networks. According to an example embodiment, a method can be performed by a router associated with a cloud. The router can receive a first network packet via a branch device. The branch device can be external to the cloud, and the first network packet can comprise a first destination internet protocol (IP) address and a first source IP address. The router can select a second source IP address from a network address translation (NAT) pool, wherein the NAT pool comprises a group of IP addresses. The router can insert the second source IP address into the first network packet as an updated first network packet source IP address, resulting in a modified first network packet. The router can store a mapping data structure comprising a relation between the second source IP address and the first source IP address, and the router can forward the modified first network packet via a firewall to a cloud workload associated with the cloud.

Next, the router can receive a second network packet via the firewall and from the cloud workload, wherein the second network packet comprises a third source IP address associated with the cloud workload, and a second destination IP address, wherein the second destination IP address matches the second source IP address. The router can use the mapping data structure and the second destination IP address to identify the first source IP address. The router can insert the first source IP address into the second network packet as an updated second network packet destination address, resulting in a modified second network packet. The router can forward the modified second network packet via the branch device and towards the updated second network packet destination address.

The techniques described herein may be performed by a router device comprising one or more processors and one or more computer-readable media storing computer-executable instructions that, when executed by the one or more processors, cause the one or more processors to perform the methods disclosed herein. The techniques described herein may also be accomplished using non-transitory computer-readable media storing computer-executable instructions that, when executed by one or more processors, perform the methods carried out by the router device.

Example Embodiments

Techniques disclosed herein can be applied to achieve symmetric networking for orphan workloads in cloud networks. Symmetric networking avoids problems that can arise from the use of firewalls in a cloud. For example, when a first firewall processes a first direction of a traffic flow, e.g., traffic flow from an external branch device towards a cloud workflow, while a second firewall processes a second direction of a traffic flow, e.g., a traffic flow from the cloud workflow back to the external branch device, the second firewall can cause problems such as undesirable TCP session drops, as explained in the background section.

When symmetric networking is implemented in a cloud, for example using the techniques described herein, a same router and firewall can be used to process both the first direction of the traffic flow and the second direction of the traffic flow. Undesirable TCP session drops and/or other problems resulting from asymmetry are thereby avoided, and cloud function is consequently improved.

Solutions according to this disclosure can configure routers to use network address translation techniques to achieve symmetric networking. Cloud networks can comprise multiple different routers, however, the routers configured according to this disclosure can optionally be limited to gateway routers that process network traffic as it either enters or leaves the cloud. A manager, also referred to herein as a cloud manager, can configure gateway routers according to this disclosure. Once configured, the gateway routers can be adapted to process network traffic in a manner that achieves symmetric networking.

Application of the techniques described herein can be applied in order to influence routing of traffic flows inside and outside of clouds. A traffic flow can comprise network packets, and traffic flows can comprise outbound traffic that flows from an origin towards a destination, as well as return traffic that returns from the destination back towards the origin. Techniques according to this disclosure can cause the return traffic to use a same gateway router and firewall as the outbound traffic.

In some instances, the origin of a traffic flow can be outside of a cloud, and the destination of the traffic flow can be inside of the cloud. The outbound traffic is therefore originated outside of the cloud, while the return traffic is originated inside of the cloud. In other instances, the origin of a traffic flow can be inside of a cloud, and the destination of the traffic flow can be outside of the cloud. The outbound traffic is therefore originated inside of the cloud, while the return traffic is originated outside of the cloud. Techniques disclosed herein include techniques applicable to traffic flows originated outside of a cloud as well techniques applicable to traffic flows originated inside of a cloud.

A first set of example operations can apply to traffic flows originated outside of a cloud. A router configured according to this disclosure can translate source IP addresses of outbound network packets originated outside of the cloud. The source IP addresses can be translated into IP addresses from an "inside NAT pool" of IP addresses assigned to the router, so that return traffic will be directed to the router and its associated firewall. After translating the source IP addresses, the router can then forward the resulting modified network packets to their destination inside the cloud.

When the return traffic arrives at the router, the return traffic will include a translated IP address, from the inside NAT pool of IP addresses, as its destination IP address. The router can use the destination IP address of the return traffic to look up the source IP address associated with the outbound network packets. The router can then translate the destination IP address of the return traffic to include the source IP address of the outbound network packets. After translating the destination IP addresses of the return traffic, the router can then forward the resulting modified network packets to their destination outside the cloud.

A second set of example operations can apply to traffic flows originated inside of a cloud. A router configured according to this disclosure can translate source IP addresses of outbound network packets originated inside of the cloud. The source IP addresses can be translated into IP addresses from an "outside NAT pool" of IP addresses assigned to the router, so that return traffic will be directed to the router and its associated firewall. After translating the source IP addresses, the router can then forward the resulting modified network packets to their destination outside the cloud.

When the return traffic arrives at the router, the return traffic will include a translated IP address, from the outside NAT pool of IP addresses, as its destination IP address. The router can use the destination IP address of the return traffic to look up the source IP address of the outbound network packets. The router can then translate the destination IP address of the return traffic to include the source IP address of the outbound network packets. After translating the destination IP addresses of the return traffic, the router can then forward the resulting modified network packets to their destination inside the cloud.

In order to process traffic flows originated outside the cloud as well as traffic flows originated inside the cloud, embodiments of this disclosure can use two different NAT pools, an inside NAT pool and an outside NAT pool, at each gateway router. These may be referred to herein as a NAT pool pair. Furthermore, the NAT pool pair assigned to each router can be distinct, i.e., both the inside NAT pool and the outside NAT pool can include IP addresses that are unique and not assigned to other NAT pools for other routers in the cloud.

In some embodiments, when a router translates a source IP address of one or more outbound network packets, the router can be configured to store a relation of the source IP address and the new (translated) IP address in a mapping data structure. The mapping data structure can then be used in connection with modifying/translating return traffic.

A router can be configured to compare destination IP addresses of network packets received at the router with the IP addresses in its inside NAT pool, its outside NAT pool, and/or with IP addresses in the mapping data structure. In response to a destination IP address matching an IP address in either the inside NAT pool, the outside NAT pool, or the mapping data structure, the router can modify the destination IP address to the related IP address stored in the mapping data structure. The router can optionally use a single mapping data structure for use in connection with all network traffic, or the router can use two different mapping data structures, including a first mapping data structure for traffic entering the cloud, and a second mapping data structure for traffic leaving the cloud.

The techniques disclosed herein are particularly applicable in connection with certain technologies. For example, clouds and routers disclosed herein can use virtualization techniques wherein, e.g., routers and firewalls can be implemented as functions of virtual hubs, and clouds can comprise multiple different virtual networks, any of which can host virtual network cloud workloads. In some technical environments, routers can connect to via software defined wide area network (SDWAN) tunnels to branch devices outside the cloud. Sending and receiving network packets can therefore comprise sending and receiving the network packets via a SDWAN tunnel. A router and/or other cloud devices, such as the cloud manager, can use a border gateway protocol (BGP) to advertise IP addresses in NAT pool pairs assigned to the router.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates an example system architecture 100 comprising a cloud 110 equipped with multiple gateway hubs 120, 140, and multiple branches 180, 190 that communicate with the cloud 110 via the gateway hubs 120, 140, in accordance with various aspects of the technologies disclosed herein. The gateway hub 120 comprises a router 122 and a firewall 124. The gateway hub 140 comprises a router 142 and a firewall 144.

The branches 180, 190 are coupled with the gateway hubs 120, 140 via tunnels. The branch 180 is coupled with gateway hub 120 via tunnel 184, and the branch 180 is coupled with gateway hub 140 via tunnel 186. The branch 190 is coupled with gateway hub 140 via tunnel 194, and the branch 180 is coupled with gateway hub 120 via tunnel 196.

In addition to the gateway hubs 120, 140, the cloud 110 comprises a manager 115, virtual networks 150, 160, 170, and internal hub 130. The virtual network 160 includes an example workload 162. The internal hub 130 includes a router 132.

Without use of the techniques disclosed herein, a potential asymmetry problem could arise in the cloud 110. If the branch 180 were to direct network traffic towards the workload 162 via the tunnel 184 and gateway hub 120, some cloud 110 configurations could potentially attempt to send return traffic to branch 180 via the gateway hub 140 and the tunnel 186. Such a problem is avoided however by configuring the gateway hubs 120 and 140 to operate as described herein.

In an example according to FIG. 1, during a setup stage, the manager 115 can configure the routers 122, 142 with NAT pool pairs. For example, the manager 115 can configure the router 122 with configuration data 117 comprising a first NAT pool pair, optionally along with further configuration modules and data to enable the router 122 to perform IP address translations using the first NAT pool pair. The manager 115 can also configure the router 142 with configuration data comprising a second NAT pool pair, although FIG. 1 does not illustrate configuration data sent to the router 142 for simplicity of illustration. The manager 115 and/or the routers 122, 142 can advertise the IP addresses in their respective NAT pool pairs, so that components of the cloud 110 associate the IP addresses of a respective NAT pool pair with a respective router 122, 142.

Upon configuration, the routers 122, 142 can be adapted to perform network address translation on received network traffic. For example, the branch 180 can send a network packet 182A via tunnel 184 to the gateway hub 120. The source IP address of the network packet 182A can be associated with branch 180, and the destination IP address of the network packet 182A can be associated with the workload 162.

Upon receiving the network packet 182A at the gateway hub 120, the router 122 can be configured to perform a translation to modify the source IP address of the network packet 182A. The router 122 can retrieve an IP address from an inside NAT pool of its NAT pool pair, and the router 122 can insert the NAT pool IP address into the network packet 182A, as the source IP address of the network packet 182A. The translation results in a modified network packet 182B.

The router 122 can be configured to forward the modified network packet 182B via the firewall 124 and toward the workload 162 in the cloud 110. For example, the router 122 can forward the modified network packet 182B to internal hub 130 and router 132, which can subsequently provide the modified network packet 182B to the virtual network 160 and workload 162. Because the modified network packet 182B includes a source IP address that is associated with the router 122, the workload 162 will direct return traffic to that source IP address and the corresponding router 122 and firewall 124.

The workload 162 may be an orphan workload, e.g., because the workload 162 is not directly connected to a gateway hub. Instead, the workload 162 is connected directly to the internal hub 130 which connects to the gateway hubs 120, 140. The workload 162 can send network packet 164A in response to the network packet 182B. For example, the network packet 164A can comprise an acknowledgement (ACK) which acknowledges receipt of the network packet 182B, or any other type of return traffic.

The workload 162 will direct the network packet 164A to a destination IP address that matches the source IP address of the modified network packet 182B. As noted above, the source IP address of the modified network packet 182B is from the inside NAT pool at the router 122 and is thereby associated with the router 122. The internal hub 130 and router 132 will therefore forward the network packet 164A towards the gateway hub 120, firewall 124, and router 122. Because the firewall 124 processed the outbound modified network packet 182B, the firewall 124 will recognize the network packet 164A as return traffic associated with the modified network packet 182B, and so the firewall 124 will not block or drop the network packet 164A.

Upon receiving the network packet 164A at the router 122, the router 122 can be configured to compare the destination IP address of the network packet 164A with, e.g., the IP addresses in the router's 122 inside NAT pool, or with the mapping data structure at the router 122, in order to determine whether to perform a destination IP address translation.

If the destination IP address of the network packet 164A matches an IP address in the inside NAT pool or in the mapping data structure, then the router 122 can replace the destination IP address of the network packet 164A with the IP address associated with the destination IP address in the mapping data structure. The inserted destination IP address will be the source IP address of the outbound network packet 182A. The packet 164A is modified by insertion of the inserted destination IP address, resulting in modified network packet 164B.

After inserting the new destination IP address in the modified network packet 164B, the router 122 can forward the modified network packet 164B towards the inserted destination IP address. In the illustrated example, the router 122 can forward the network packet 164B towards branch 180.

If another device, e.g., branch 190, communicates with the workload 162 via the gateway hub 120, e.g., using tunnel 196, a similar process can be carried out by the gateway hub 120, router 122, and firewall 124, namely, the process described above with regard to branch 180 and network packets 182A, 182B, 164A and 164B, with the difference that branch 190 will be associated with a different source IP address than branch 180, and router 122 can use a different IP address from its inside NAT pool for communications from branch 190. The router 122 can apply different IP addresses from its inside NAT pool to communications originated by different branches/devices, so that the router 122 will correctly route return traffic to the different branches/devices. In some embodiments, the router 122 can mark IP addresses as "in use," or can otherwise remove IP addresses from the IP addresses in the inside NAT pool for a predetermined period of time after an IP address has been inserted into a network packet.

Another set of operations that can be understood with reference to FIG. 1 are operations performed when network packets 164A and 164B are the outbound traffic, and network packets 182A and 182B are the return traffic. In this circumstance, the router 122 can perform similar operations as described above, however, the router 122 can use its outside NAT pool instead of its inside NAT pool.

For example, the workload 162 can send a network packet 164A to the gateway hub 120. The source IP address of the network packet 164A can be associated with workload 162, and the destination IP address of the network packet 164A can be associated with the branch 180.

Upon receiving the network packet 164A at the gateway hub 120, the router 122 can be configured to perform a translation to modify the source IP address of the network packet 164A. The router 122 can retrieve an IP address from an outside NAT pool of its NAT pool pair, and the router 122 can insert the NAT pool IP address into the network packet 164A, as the source IP address of the network packet 164A. The translation results in a modified network packet 164B.

The router 122 can be configured to forward the modified network packet 164B via the firewall 124 and toward the branch 180. For example, the router 122 can forward the modified network packet 164B via tunnel 184. Because the modified network packet 164B includes a source IP address that is associated with the router 122, the branch 180 will direct return traffic to that source IP address and the corresponding router 122 and firewall 124.

The branch 180 can send network packet 182A in response to the network packet 164B. For example, the network packet 182A can comprise an ACK which acknowledges receipt of the network packet 164B, or any other type of return traffic. The branch 180 will direct the network packet 182A to a destination IP address that matches the source IP address of the modified network packet 164B. As noted above, the source IP address of the modified network packet 164B is from the outside NAT pool at the router 122 and is thereby associated with the router 122. The firewall 124 will recognize the network packet 182A as return traffic associated with the modified network packet 164B, and so the firewall 124 will not block or drop the network packet 182A.

Upon receiving the network packet 182A at the router 122, the router 122 can be configured to compare the destination IP address of the network packet 182A with, e.g., the IP addresses in the router's 122 outside NAT pool, or with the mapping data structure at the router 122, in order to determine whether to perform a destination IP address translation.

If the destination IP address of the network packet 182A matches an IP address in the outside NAT pool or in the mapping data structure, then the router 122 can replace the destination IP address of the network packet 182A with the IP address associated with the destination IP address in the mapping data structure. The inserted destination IP address will be the source IP address of the outbound network packet 164A. The network packet 182A is modified by insertion of the inserted destination IP address, resulting in modified network packet 182B.

After inserting the new destination IP address in the modified network packet 182B, the router 122 can forward the modified network packet 182B towards the inserted destination IP address. In the illustrated example, the router 122 can forward the network packet 182B towards the workload 162.

In an example implementation according to FIG. 1, branches 180, 190 can comprise SDWAN branches that reach cloud workloads such as workload 162 through multiple different SDWAN gateway hub routers 122, 142. Virtual networks 150, 160, 170 (hosting workloads) are connected to virtual hubs 120, 130, 140 and the virtual hubs 120, 130, 140 can be connected in full mesh in a given virtual WAN. With this full mesh star topology of virtual hubs 120, 130, 140, potentially every virtual network 150, 160, 170 can be reachable through potentially every virtual gateway hub 120, 140.

The branches 180, 190 may be connected to virtual gateway hubs 120, 140 in a region using network virtual appliance, which provides network functions such as SDWAN VNF and VPN functionalities. Even though there can be tens to hundreds of virtual hubs 120, 130, 140 participating in the star topology to connect thousands of virtual networks 150, 160, 170, the branches 180, 190 may be connected to a small number, e.g., one or two, local region virtual gateway hubs 120, 140 hosting network virtual appliances. The branches 180, 190 can get route advertisements for some or all virtual networks 150, 160, 170 through these multiple virtual gateway hubs 120, 140 and these routes can have equal path metrics.

When a branch 180 initiates traffic to reach a destination server in a virtual network 160 that hosts a workload 162, traffic has a possibility to enter the cloud 110 through any one of the connected virtual gateway hubs 120, 140. In such scenario, without the use of the techniques disclosed herein, the return path from the virtual network workload 162 to the branch 180 can exit the cloud 110 through any one of the virtual gateway hubs 120, 140. With this behavior it would not be possible to predict forward and return paths of traffic, leading to asymmetric flows that lead to TCP session drops when the firewalls 124, 144 are enabled in the virtual gateway hubs 120, 140.

In FIG. 1, branch 180 can be connected to both of virtual gateway hub 120 and virtual gateway hub 140, wherein each of the virtual gateway hubs 120, 140 host SDWAN NVAs. The virtual network 160 is connected to a virtual hub 130, which is not directly connected to the branch 180.

The virtual network 160 can use, e.g., a prefix such as 172.16.100.0/24 which can be advertised by both of the virtual gateway hubs 120, 140 with equal autonomous system (AS) path lengths to NVAs at virtual gateway hubs 120, 140. The virtual gateway hubs 120, 140 can in turn advertise these equal distance path routes to the branch 180. A route table at branch 180 can include next hops for the virtual network 160's prefix, which, can be equal for both the route via virtual gateway hub 120 and virtual gateway hub 140.

Meanwhile, branch 180's prefix routes, e.g., 192.168.10.0/24 may be advertised to both virtual gateway hub 120 and virtual gateway hub 140 through NVAs. Both virtual gateway hub 120 and virtual gateway hub 140 advertise this branch 180 prefix route to virtual hub 130. The routes can have equal distance path metrics. The route table reflected in virtual hub 130 may comprise next hops for branch 180 and branch 190 prefixes, with equal AS path lengths via virtual gateway hub 120 and virtual gateway hub 140. Because of these equal path lengths, the techniques described herein can use network address translation to ensure flow stickiness of traffic processed via each of the virtual gateway hubs 120, 140.

Figure 2A:
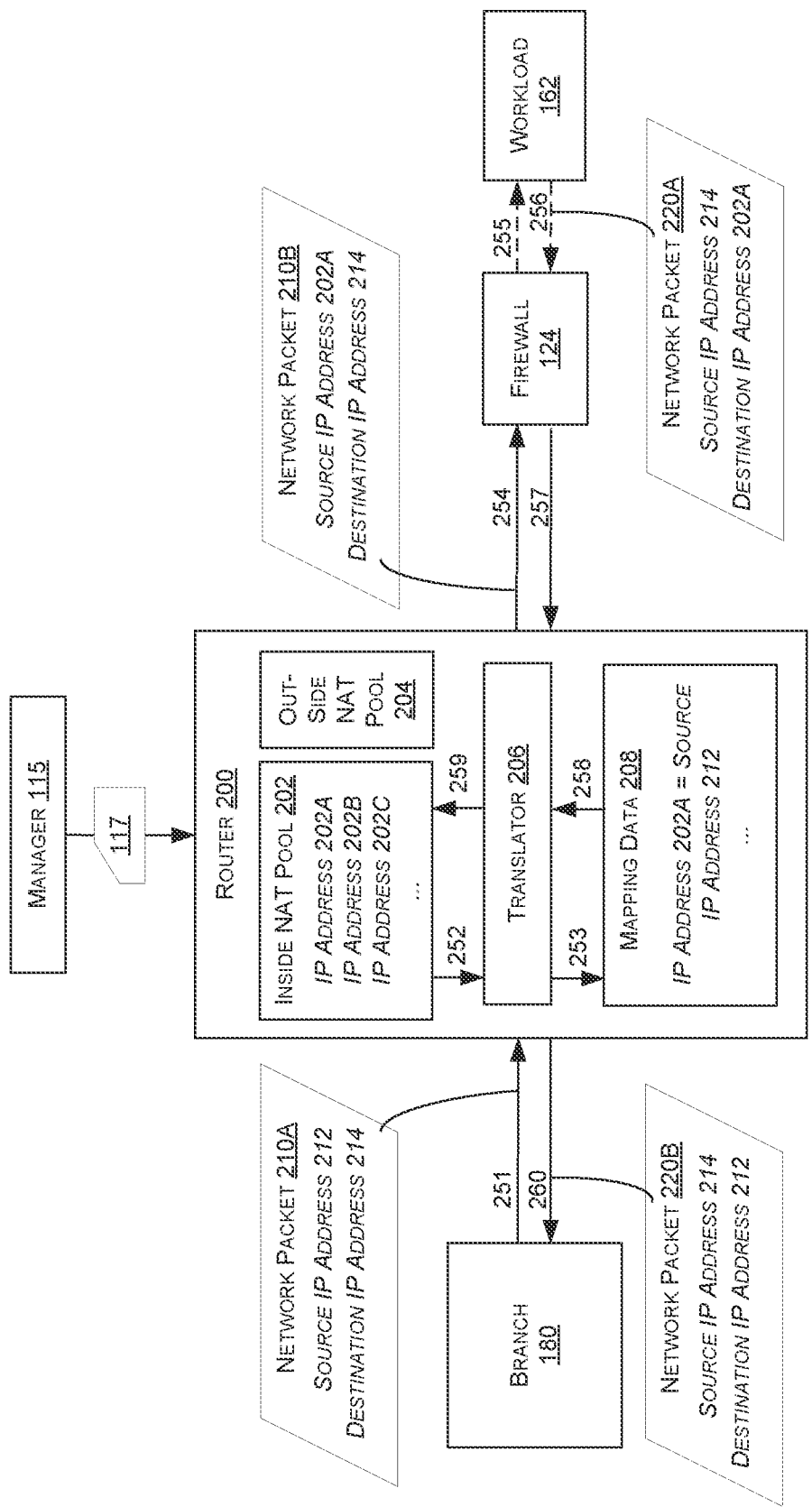
FIG. 2A illustrates an example router that can be included in gateway hubs, and example operations thereof, in accordance with various aspects of the technologies disclosed herein.

FIG. 2A illustrates an example router 200 that can be included in gateway hubs 120, 140, and example operations thereof, in accordance with various aspects of the technologies disclosed herein. The router 200 can implement either of the routers 122, 142 introduced in FIG. 1 in some embodiments. The router 200 comprises an inside NAT pool 202, an outside NAT pool 204, a translator 206 and mapping data 208. FIG. 2A also includes several elements previously introduced in FIG. 1, such as branch 180, firewall 124, workload 162, manager 115 and configuration data 117.

In an example according to FIG. 2A, during setup, the router 200 can receive the configuration data 117 from the manager 115. The configuration data 117 can comprise the inside NAT pool 202, the outside NAT pool 204, and optionally the translator 206 and mapping data 208. The router 200 can initially instantiate the inside NAT pool 202, the outside NAT pool 204, the translator 206 and the mapping data 208 at the router 200.

After setup, the router 200 can be adapted to perform the network address translation techniques disclosed herein. For example, at operation 251, the router 200 can receive network packet 210A from the branch 180. The network packet 210A can comprise a source IP address 212, a destination IP address 214, and any additional network packet data.

At 252, in response to receiving the network packet 210A at the router 200, the translator 206 can retrieve an IP address, e.g., IP address 202A, from the inside NAT pool 202. Translator 206 can replace the source IP address 212 in the network packet 210A with the retrieved IP address 202A. The resulting modified network packet 210B comprises the source IP address 202A, the destination IP address 214, and the same additional network packet data as previously included in network packet 210A.

At 253, the translator 206 can store, in the mapping data 208, a relation between the retrieved IP address 202A and the source IP address 212. The translator 206 can furthermore optionally deactivate or remove the IP address 202A from the inside NAT pool 202, so the IP address 202A is not used for other traffic flows. In some embodiments, the translator 206 can be configured to select IP addresses in the inside NAT pool 202 and the outside NAT pool 204 according to a protocol such as round-robin or another selection approach, in order to avoid conflicting use of IP addresses. At 254, the router 200 can forward the modified network packet 210B via the firewall 124 and toward the workload 162. Operation 255 illustrates the modified network packet 210B traversing the cloud to the workload 162.

At 256, the workload 162 can send return traffic comprising the network packet 220A towards the router 200. The network packet 220A can comprise a source IP address 214, a destination IP address 202A, and any additional network packet data. The destination IP address 202A matches the source IP address 202A of the modified network packet 210B. The firewall 124 recognizes return traffic, and at 257 the firewall 124 passes the network packet 220A through to the router 200.

At 258, in response to receiving the network packet 220A at the router 200, the translator 206 can compare the destination IP address 202A of the network packet 220A to IP addresses in the mapping data 208. When a match is observed, the translator 206 can replace the destination IP address 202A with the related source IP address 212 from the mapping data 208. The resulting modified network packet 220B comprises the source IP address 214, the destination IP address 212, and the same additional network packet data as previously included in network packet 220A.

At 259, the translator 206 can optionally restore, optionally after a predetermined time interval, the IP address 202A within the inside NAT pool 202, so that the IP address 202A is available for use with other traffic flows. At 260, the router 200 can forward the modified network packet 220B and toward the branch 180. The modified network packet 220B can optionally also traverse the firewall 124 in its route to the branch 180.

Figure 2B:
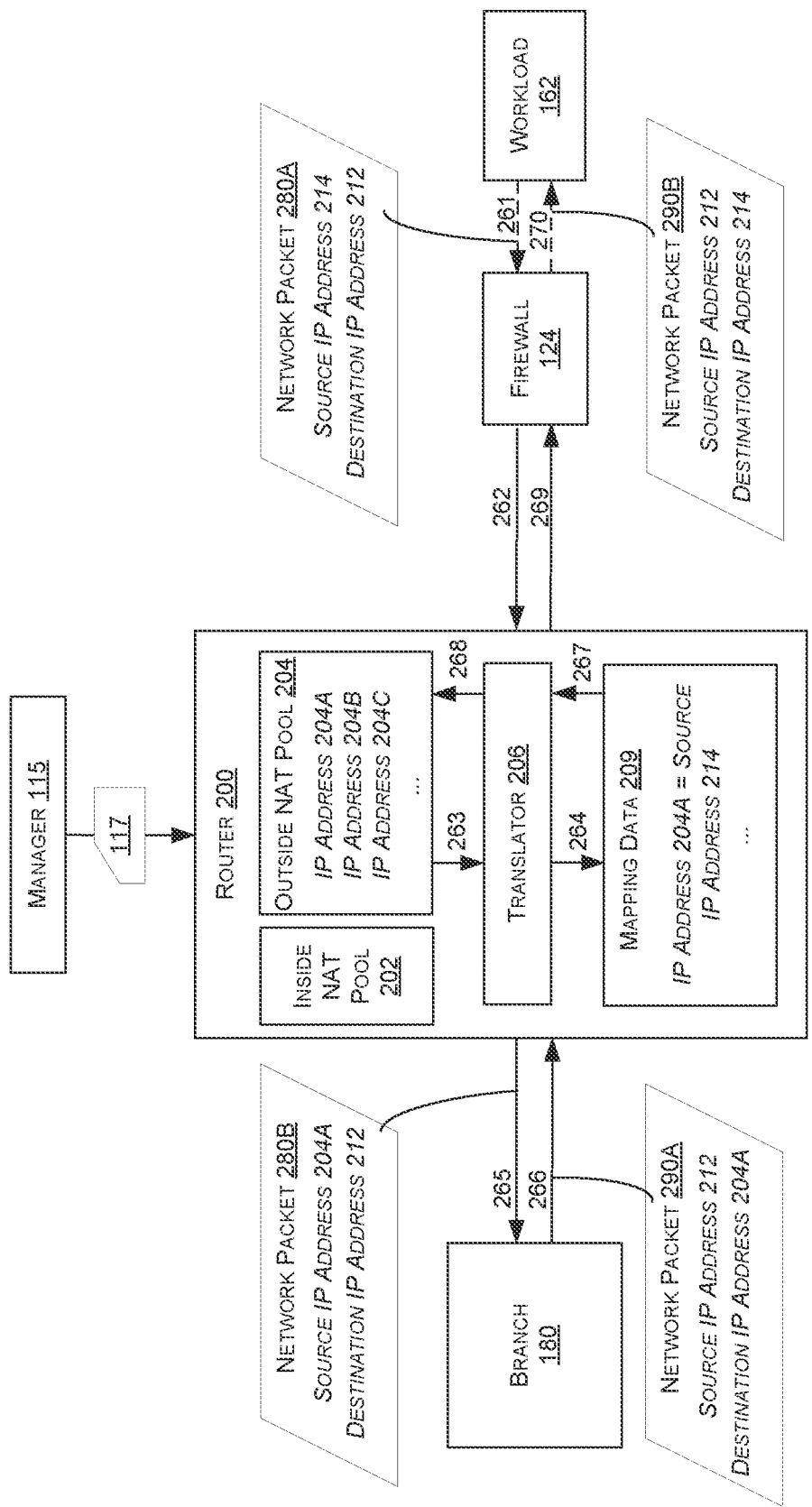
FIG. 2B illustrates further example operations performed by the router introduced in FIG. 2A, in accordance with various aspects of the technologies disclosed herein.

FIG. 2B illustrates further example operations performed by the router 200 introduced in FIG. 2A, in accordance with various aspects of the technologies disclosed herein. In an example according to FIG. 2B, outbound traffic is initiated at the workload 162 and return traffic is initiated at the branch 180, and so the router 200 uses the outside NAT pool 204.

At operation 261, the workload can send network packet 280A to the router 200. The network packet 280A can comprise a source IP address 214, a destination IP address 212, and any additional network packet data. The network packet 280A can traverse the firewall 124 and at operation 262 the network packet 280A is received at the router 200.

At 263, in response to receiving the network packet 280A at the router 200, the translator 206 can retrieve an IP address, e.g., IP address 204A, from the outside NAT pool 204. Translator 206 can replace the source IP address 214 in the network packet 280A with the retrieved IP address 204A. The resulting modified network packet 280B comprises the source IP address 204A, the destination IP address 212, and the same additional network packet data as previously included in network packet 280A.

At 264, the translator 206 can store, in the mapping data 208, a relation between the retrieved IP address 204A and the source IP address 214. The translator 206 can furthermore optionally deactivate or remove the IP address 204A from the outside NAT pool 204, so the IP address 204A is not used for other traffic flows. In some embodiments, the translator 206 can be configured to use IP addresses in the inside NAT pool 202 and the outside NAT pool 204 according to a protocol such as round-robin or other incrementing approach, in order to avoid conflicting use of IP addresses. At 265, the router 200 can forward the modified network packet 280B toward the branch 180. The modified network packet 280B can optionally also traverse the firewall 124 in its route to the branch 180.

At 266, the branch 180 can send return traffic comprising the network packet 290A towards the router 200. The network packet 290A can comprise a source IP address 212, a destination IP address 204A, and any additional network packet data. The destination IP address 204A matches the source IP address 204A of the modified network packet 280B. In some embodiments, the firewall 124 recognizes return traffic, and the firewall 124 passes the network packet 290A through to the router 200.

At 267, in response to receiving the network packet 290A at the router 200, the translator 206 can compare the destination IP address 204A of the network packet 290A to IP addresses in the mapping data 208. When a match is observed, the translator 206 can replace the destination IP address 204A with the related source IP address 214 from the mapping data 208. The resulting modified network packet 290B comprises the source IP address 212, the destination IP address 214, and the same additional network packet data as previously included in network packet 290A.

At 268, the translator 206 can optionally restore, after a predetermined time interval, the IP address 204A within the outside NAT pool 204, so that the IP address 204A is available for use with other traffic flows. At 269, the router 200 can forward the modified network packet 290B optionally via firewall 124 and toward the workload 162.

Figure 3:
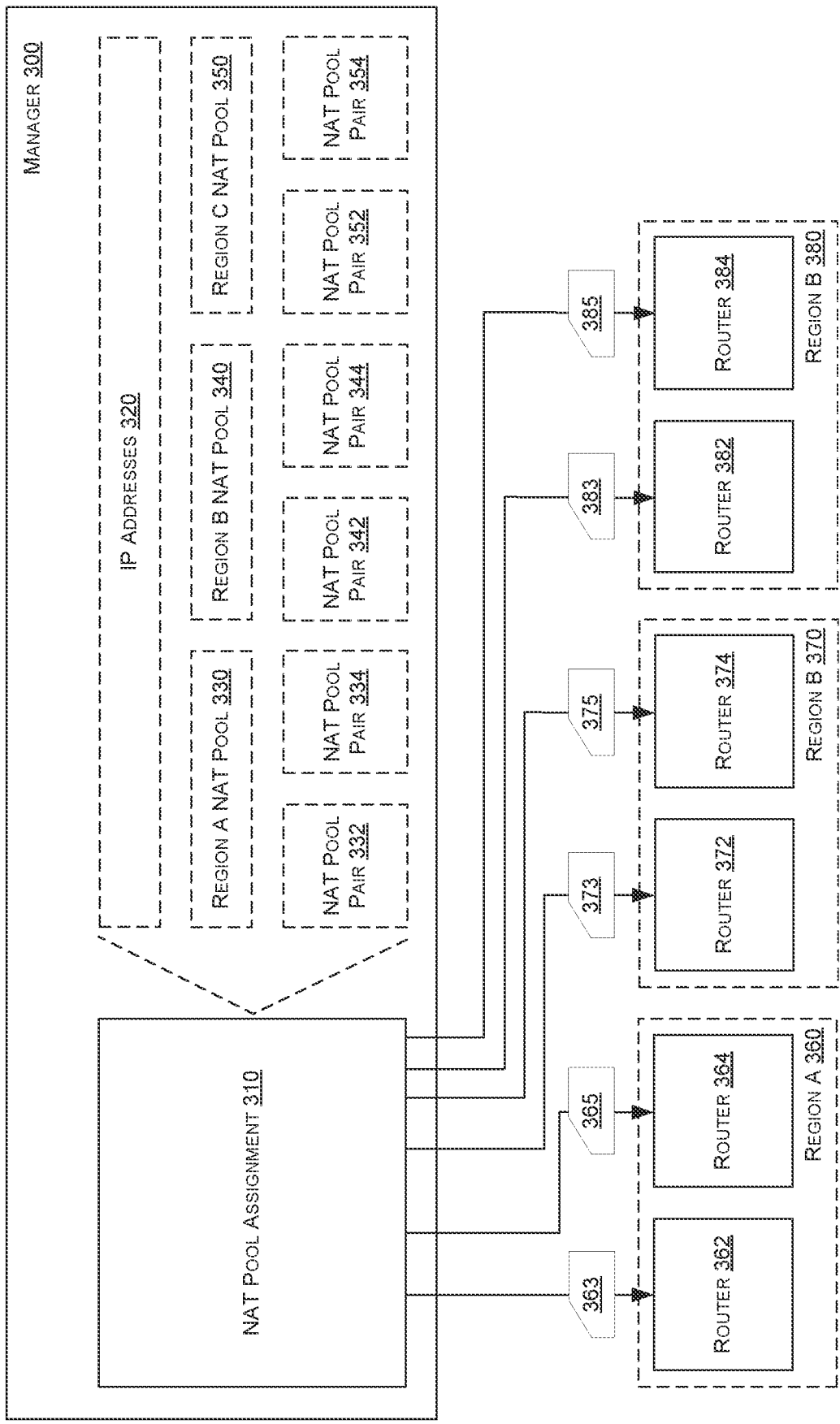
FIG. 3 illustrates an example manager adapted to configure routers, in accordance with various aspects of the technologies disclosed herein.

FIG. 3 illustrates an example manager 300 adapted to configure routers 362, 364, 372, 374, 382, 384, in accordance with various aspects of the technologies disclosed herein. The manager 300 can implement the manager 115 introduced in FIG. 1 in some embodiments, and the routers 362, 364, 372, 374, 382, 384 can implement routers such as 122, 142 introduced in FIG. 1 in some embodiments.

In FIG. 3, the manager 300 comprises NAT pool assignment 310 and IP address data. The IP address data includes IP addresses 320. The IP address data further includes region A NAT pool 330, region B NAT pool 340, and region C NAT pool 350. The IP address data further includes NAT pool pairs 332, 334, 342, 344, 352, and 354.

The routers 362, 364, 372, 374, 382, 384 are located in different regions. Region A 360 comprises router 362 and router 364. Region B 370 comprises router 372 and router 374. Region C 380 comprises router 382 and router 384. The number of regions, the number of routers in each region, and the number of NAT pool pairs illustrated in FIG. 3 are examples only, and other embodiments can include more or fewer elements.

In example operations according to FIG. 3, the NAT pool assignment 310 can initially determine a number of different cloud regions served by a cloud, e.g., by the cloud 110 introduced in FIG. 1. The cloud regions can correspond to geographical regions. For example, the NAT pool assignment 310 can determine that a cloud serving the United States comprises three regions, a US west region, a US east region, and a US central region. In some embodiments, instead of or in addition to regions, the NAT pool assignment 310 can determine a number of cloud divisions according to another dimension or variable. For example, the NAT pool assignment 310 can determine a number of different network clusters defined at least in part by a density metric of high-speed connections between devices, or a number of different function clusters defined at least in part by different combinations of usage metrics associated with different cloud user populations.

In the example illustrated in FIG. 3, the NAT pool assignment 310 determined that an example cloud served by the manager 300 comprises three regions, namely region A 360, region B 370, and region C 380. The NAT pool assignment 310 is further configured to determine total number of gateway hubs or gateway routers in each region. For example, the NAT pool assignment 310 determined region A 360 comprises two routers 362, 364, region B 370 comprises two routers 372, 374, and region C 380 comprises two routers 382, 384.

Once the NAT pool assignment 310 has determined the total number or regions (or other cloud dimensions) and the total number of gateway routers in each region, the NAT pool assignment 310 can proceed with dividing IP address data into NAT pool pairs for use by the routers. The NAT pool assignment 310 can generate or retrieve a global group of IP addresses 320 for use by the routers in the cloud. The NAT pool assignment 310 can then divide the IP addresses 320 into a number of different groups that corresponds to the number of different cloud regions.

In the illustrated example, the NAT pool assignment 310 has determined there are three cloud regions including region A 360, region B 370, and region C 380, and so the NAT pool assignment 310 divides the IP addresses 320 into three different regional NAT pools, including region A NAT pool 330, region B NAT pool 340, and region C NAT pool 350. NAT pool assignment 310 can designate region A NAT pool 330 for use by the routers of region A 360, region B NAT pool 340 for use by the routers of region B 370, and region C NAT pool 350 for use by the routers of region C 380.

In some embodiments, the NAT pool assignment 310 can divide the IP addresses 320 into regional groups that comprise blocks of sequential IP addresses. In other embodiments, the NAT pool assignment 310 can divide the IP addresses 320 into groups comprising randomly selected IP addresses from among the IP addresses 320. In still further embodiments, the NAT pool assignment 310 can divide the IP addresses 320 into groups comprising IP addresses that are selected according to any desired IP address properties or address selection patterns, such as assigning IP addresses comprising a first subgroup of numbers to a first group, assigning IP addresses comprising a second subgroup of numbers to a second group, and so on.

The NAT pool assignment 310 can optionally be configured to include different total numbers of IP addresses in each of the region A NAT pool 330, region B NAT pool 340, and region C NAT pool 350. For example, the numbers of IP addresses in each of the regional NAT pools 330, 340, 350 can correspond to a number or routers in each of the regions, e.g., in region A 360, region B 370, and region C 380. NAT pool assignment 310 can be configured to multiply a number of routers in a region by a number of IP addresses to be included in NAT pool pairs 332, 334, 342, 344, 352, and 354 to determine a total number of IP addresses in each of the region A NAT pool 330, region B NAT pool 340, and region C NAT pool 350.

After dividing the IP addresses 320 into the region A NAT pool 330, region B NAT pool 340, and region C NAT pool 350, the NAT pool assignment 310 can then divide each of the region A NAT pool 330, region B NAT pool 340, and region C NAT pool 350 into multiple distinct NAT pool pairs. The number of NAT pool pairs generated for each of the region A NAT pool 330, region B NAT pool 340, and region C NAT pool 350 can be based on the number of routers in the corresponding cloud region. For example, in FIG. 3, the NAT pool assignment 310 has divided the region A NAT pool 330 into two NAT pool pairs 332, 334, because region A 360 includes two routers 362, 364. Similarly, the NAT pool assignment 310 has divided the region B NAT pool 340 into two NAT pool pairs 342, 344, because region B 370 includes two routers 372, 374. The NAT pool assignment 310 has divided the region C NAT pool 350 into two NAT pool pairs 352, 354, because region C 380 includes two routers 382, 384.

Each of the NAT pool pairs 332, 334, 342, 344, 352, and 354 can include a pair of NAT pools including an inside NAT pool and an outside NAT pool, for assignment to a router. Furthermore, the NAT pool pairs 332, 334, 342, 344, 352, and 354 can be distinct from one another, so that each of the NAT pool pairs 332, 334, 342, 344, 352, and 354 includes a group of different IP addresses which are not included in any other of the other NAT pool pairs 332, 334, 342, 344, 352, and 354. Each of the NAT pool pairs 332, 334, 342, 344, 352, and 354 can optionally comprise an identical predetermined number of IP addresses therein. Alternatively, NAT pool pairs can be of different sizes based on, e.g., different volumes of traffic historically processed, or predicted to be processed, by different routers.

After generating the NAT pool pairs 332, 334, 342, 344, 352, and 354, the NAT pool assignment 310 can be configured to distribute configuration data 363, 365, 373, 375, 383, to the routers 362, 364, 372, 374, 382, 384. Each configuration data 363, 365, 373, 375, 383, can comprising a NAT pool pair of the NAT pool pairs 332, 334, 342, 344, 352, and 354, along with other configuration data and modules as needed to configure a router.

For example, the configuration data 363 can comprise the NAT pool pair 332 along with other configuration data. The configuration data 365 can comprise the NAT pool pair 334 along with other configuration data. The configuration data 373 can comprise the NAT pool pair 342 along with other configuration data. The configuration data 375 can comprise the NAT pool pair 344 along with other configuration data. The configuration data 383 can comprise the NAT pool pair 352 along with other configuration data. The configuration data 385 can comprise the NAT pool pair 354 along with other configuration data.

In an example implementation, the manager 300 can comprise a network hierarchy manager configured to create NAT pools to match each cloud region. In some embodiments, operations of the network hierarchy manager can be triggered in response to onboarding of edge software, such as Cisco® Catalyst® 8000V edge software via Network hierarchy. The manager 300 can assign, for every router, a distinct NAT pool pair in its cloud region, the NAT pool pair comprising one or more inside NAT pool and outside NAT pool IP addresses. The manager 300 can set up bi-directional NAT on each SDWAN router in the regions where cloud routers are deployed.

Figure 4:
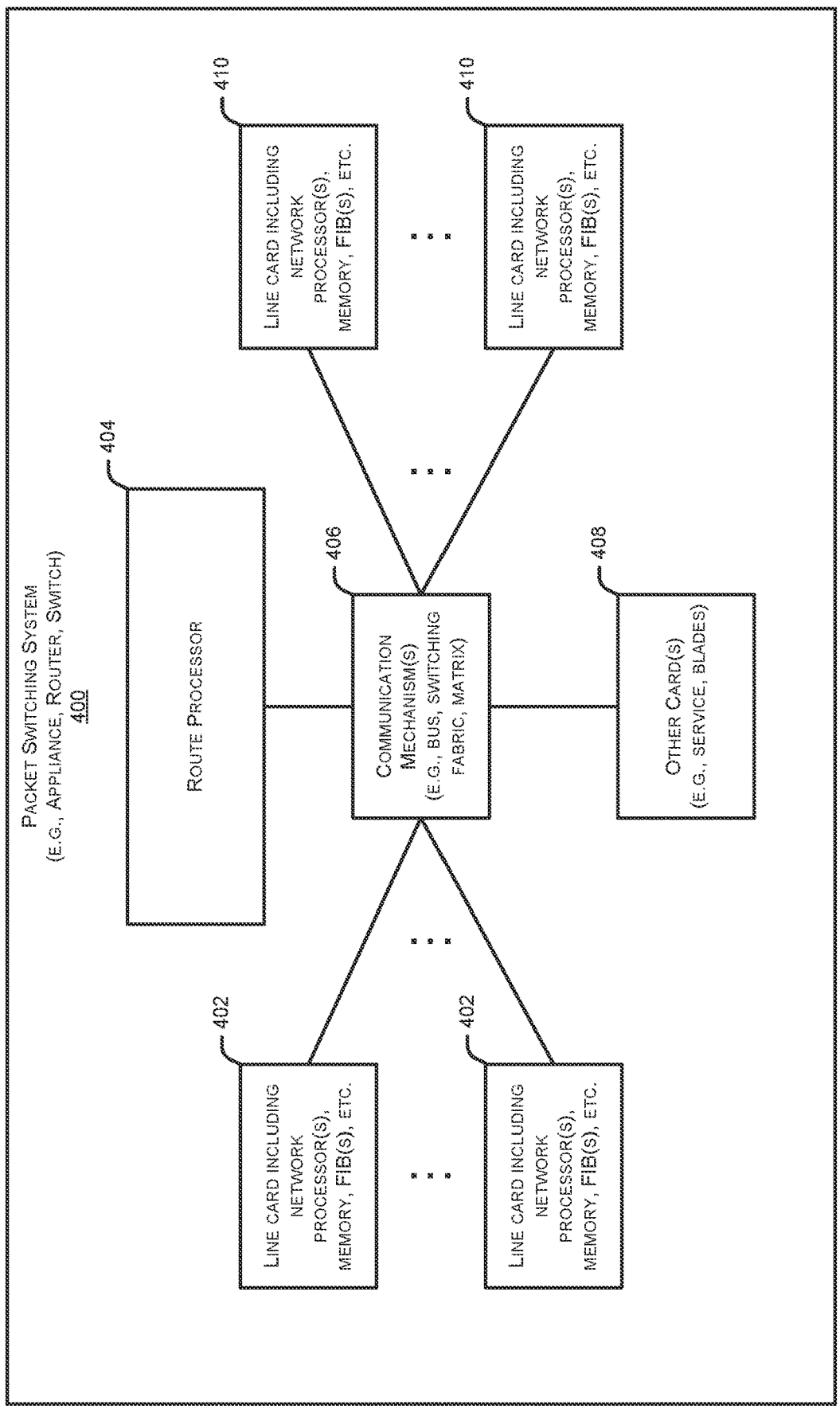
FIG. 4 illustrates an example packet switching system that can be utilized to implement a router, in accordance with various aspects of the technologies disclosed herein.

FIG. 4 illustrates an example packet switching system that can be utilized to implement a router, in accordance with various aspects of the technologies disclosed herein. In some examples, the packet switching system 400 can be implemented as one or more packet switching device(s). The packet switching system 400 may be employed in a network, such as, for example, the cloud 110 illustrated in FIG. 1, to process network traffic by receiving and forwarding network packets. The illustrated elements of the packet switching system 400 can include, e.g., components introduced in FIG. 2A and 2B to configure the packet switching system 400 to perform operations according to this disclosure.

In some examples, the packet switching system 400 may comprise multiple line card(s) 402, 410, each with one or more network interfaces for sending and receiving packets over communications links (e.g., possibly part of a link aggregation group). The packet switching system 400 may also have a control plane with one or more processing elements, e.g., the route processor 404 for managing the control plane and/or control plane processing of packets associated with forwarding of packets in a network. The packet switching system 400 may also include other cards 408 (e.g., service cards, blades) which include processing elements that are used to process (e.g., forward/send, drop, manipulate, change, modify, receive, create, duplicate, apply a service) packets associated with forwarding of packets in a network. The packet switching system 400 may comprise a communication mechanism 406 (e.g., bus, switching fabric, and/or matrix, etc.) for allowing the different entities 402, 404, 408 and 410 to communicate. The communication mechanism 406 can optionally be hardware-based. Line card(s) 402, 410 may perform the actions of being both an ingress and/or an egress line card 402, 410, with regard to multiple packets and/or packet streams being received by, or sent from, the packet switching system 400.

Figure 5:
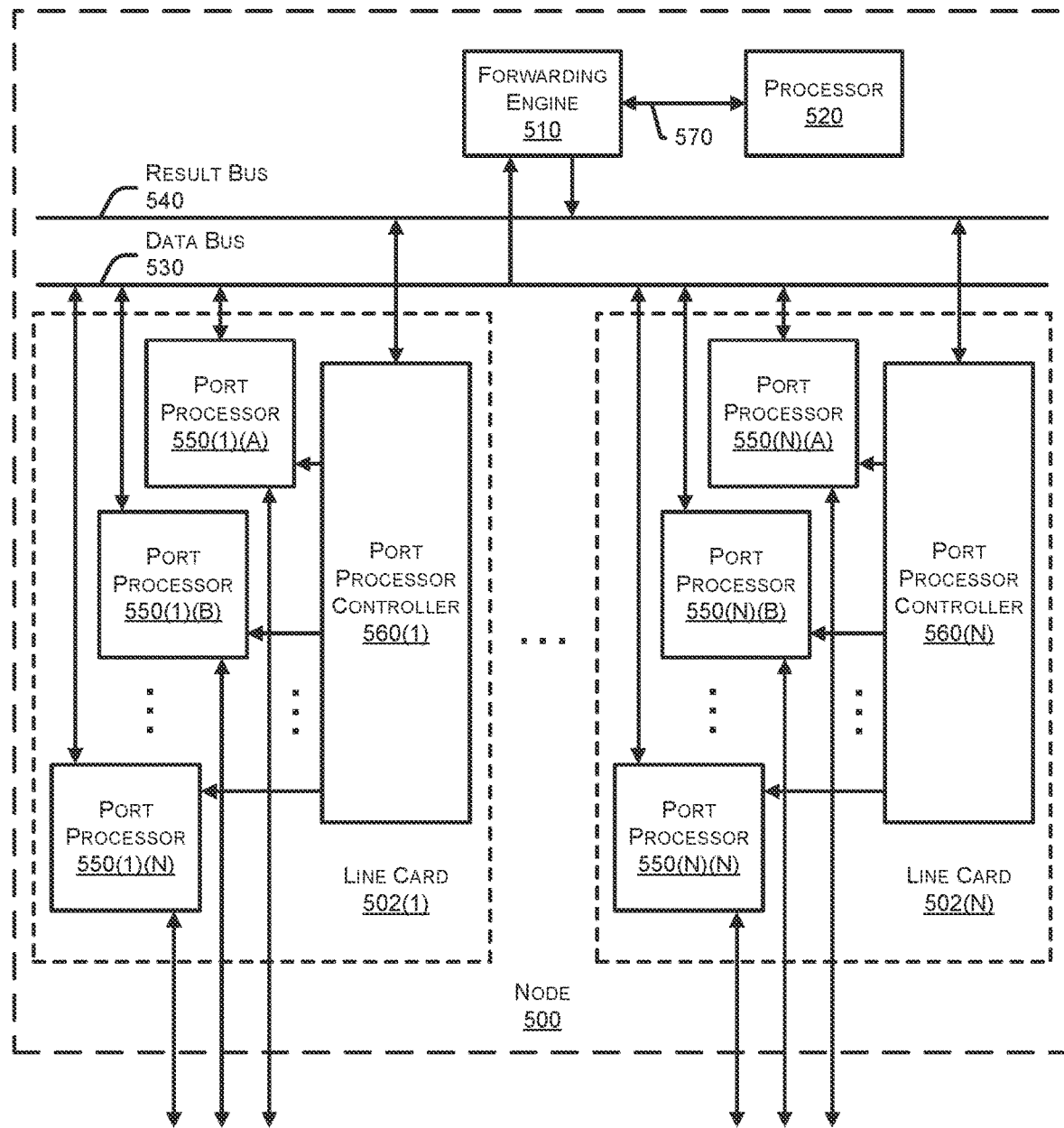
FIG. 5 illustrates an example node that can be utilized to implement a router, in accordance with various aspects of the technologies disclosed herein.

FIG. 5 illustrates an example node 500 that can be utilized to implement a router, in accordance with various aspects of the technologies disclosed herein. In some examples, node 500 may include any number of line cards 502, e.g., line cards 502(1)-(N), where N may be any integer greater than 1, and wherein the line cards 502 are communicatively coupled to a forwarding engine 510 (also referred to as a packet forwarder) and/or a processor 520 via a data bus 530 and/or a result bus 540. Line cards 502 may include any number of port processors 550, for example, line card 502(1) comprises port processors 550(1)(A)-550(1)(N), and line card 502(N) comprises port processors 550(N)(A)-550(N)(N). The port processors 550 can be controlled by port processor controllers 560, e.g., port processor controllers 560(1), 560(N), respectively. Additionally, or alternatively, the forwarding engine 510 and/or the processor 520 can be coupled to one another via the data bus 530 and the result bus 540, and may also be communicatively coupled to one another by a communications link 570. The processors (e.g., the port processor(s) 550 and/or the port processor controller(s) 560) of each line card 502 may optionally be mounted on a single printed circuit board.

When a packet or packet and header are received, the packet or packet and header may be identified and analyzed by the node 500 in the following manner. Upon receipt, a packet (or some or all of its control information) or packet and header may be sent from one of port processor(s) 550 at which the packet or packet and header was received and to one or more of those devices coupled to the data bus 530 (e.g., others of the port processor(s) 550, the forwarding engine 510 and/or the processor 520). Handling of the packet or packet and header may be determined, for example, by the forwarding engine 510. For example, the forwarding engine 510 may determine that the packet or packet and header should be forwarded to one or more of the other port processors 550. This may be accomplished by indicating to corresponding one(s) of port processor controllers 560 that a copy of the packet or packet and header held in the given one(s) of port processor(s) 550 should be forwarded to the appropriate other one of port processor(s) 550. Additionally, or alternatively, once a packet or packet and header has been identified for processing, the forwarding engine 510, the processor 520, and/or the like may be used to process the packet or packet and header in some manner and/or may add packet security information in order to secure the packet.

On a node 500 sourcing a packet or packet and header, processing may include, for example, encryption of some or all of the packet or packet and header information, the addition of a digital signature, and/or some other information and/or processing capable of securing the packet or packet and header. On a node 500 receiving a packet or packet and header, the processing may be performed to recover or validate the packet or packet and header information that has been secured.

Figure 6:
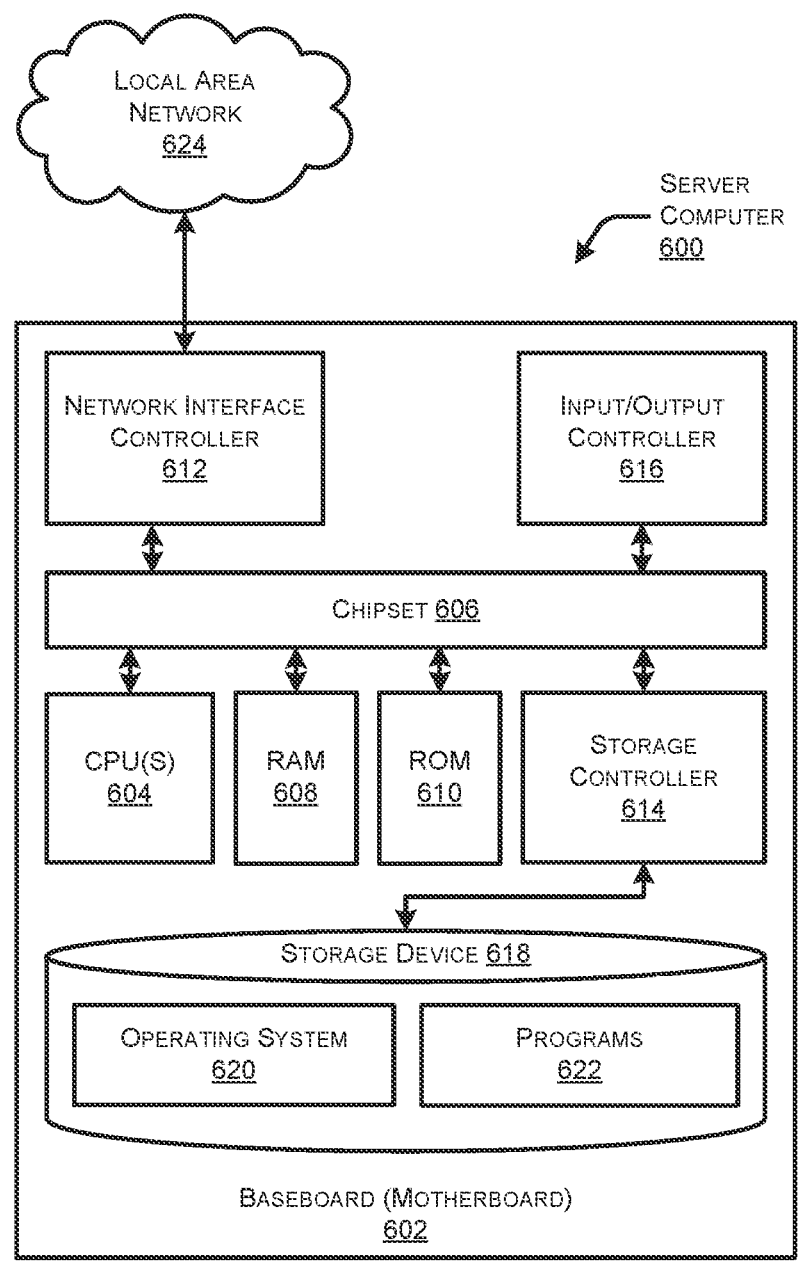
FIG. 6 illustrates an example computer hardware architecture that can implement a server device that can host cloud functions, in accordance with various aspects of the technologies disclosed herein.

FIG. 6 illustrates an example computer hardware architecture that can implement a server device that can host cloud functions, in accordance with various aspects of the technologies disclosed herein. The computer architecture shown in FIG. 6 illustrates a conventional server computer, workstation, desktop computer, laptop, tablet, network appliance, e-reader, smartphone, or other computing device, and can be utilized to execute any of the software components presented herein. The server computer 600 may in some examples, correspond to a device that can host a manager 115, a gateway hub 120, 140, an internal hub 130, or a virtual network 150, 160, 170, described herein with respect to FIG. 1. The server computer 600 may also correspond to a device that can host a branch 180, 190, also described herein with respect to FIG. 1.

The server computer 600 includes a baseboard 602, or "motherboard," which is a printed circuit board to which a multitude of components or devices can be connected by way of a system bus or other electrical communication paths. In one illustrative configuration, one or more central processing units ("CPUs") 604 operate in conjunction with a chipset 606. The CPUs 604 can be standard programmable processors that perform arithmetic and logical operations necessary for the operation of the server computer 600.

The CPUs 604 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 606 provides an interface between the CPUs 604 and the remainder of the components and devices on the baseboard 602. The chipset 606 can provide an interface to a RAM 608, used as the main memory in the server computer 600. The chipset 606 can further provide an interface to a computer-readable storage medium such as a read-only memory ("ROM") 610 or non-volatile RAM ("NVRAM") for storing basic routines that help to startup the server computer 600 and to transfer information between the various components and devices. The ROM 610 or NVRAM can also store other software components necessary for the operation of the server computer 600 in accordance with the configurations described herein.

The server computer 600 can operate in a networked environment using logical connections to remote computing devices and computer systems through a network, such as the LAN 624. The chipset 606 can include functionality for providing network connectivity through a NIC 612, such as a gigabit Ethernet adapter. The NIC 612 is capable of connecting the server computer 600 to other computing devices over the network 624. It should be appreciated that multiple NICs 612 can be present in the server computer 600, connecting the computer to other types of networks and remote computer systems.

The server computer 600 can be connected to a storage device 618 that provides non-volatile storage for the server computer 600. The storage device 618 can store an operating system 620, programs 622, and data, to implement any of the various components described in detail herein. The storage device 618 can be connected to the server computer 600 through a storage controller 614 connected to the chipset 606. The storage device 618 can comprise one or more physical storage units. The storage controller 614 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The server computer 600 can store data on the storage device 618 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 618 is characterized as primary or secondary storage, and the like.

For example, the server computer 600 can store information to the storage device 618 by issuing instructions through the storage controller 614 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The server computer 600 can further read information from the storage device 618 by detecting the physical states or characteristics of one or more particular locations within the physical storage units.

In addition to the mass storage device 618 described above, the server computer 600 can have access to other computer-readable storage media to store and retrieve information, such as program modules, data structures, or other data. It should be appreciated by those skilled in the art that computer-readable storage media is any available media that provides for the non-transitory storage of data and that can be accessed by the server computer 600. In some examples, the operations performed by the computing elements illustrated in FIG. 1, and or any components included therein, may be supported by one or more devices similar to server computer 600.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 618 can store an operating system 620 utilized to control the operation of the server computer 600. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 618 can store other system or application programs and data utilized by the server computer 600.

In one embodiment, the storage device 618 or other computer-readable storage media is encoded with computer-executable instructions which, when loaded into the server computer 600, transform the computer from a general-purpose computing system into a special-purpose computer capable of implementing the embodiments described herein. These computer-executable instructions transform the server computer 600 by specifying how the CPUs 604 transition between states, as described above. According to one embodiment, the server computer 600 has access to computer-readable storage media storing computer-executable instructions which, when executed by the server computer 600, perform the various processes described above with regard to FIGS. 7-8. The server computer 600 can also include computer-readable storage media having instructions stored thereupon for performing any of the other computer-implemented operations described herein.

The server computer 600 can also include one or more input/output controllers 616 for receiving and processing input from a number of input devices, such as a keyboard, a mouse, a touchpad, a touch screen, an electronic stylus, or other type of input device. Similarly, an input/output controller 616 can provide output to a display, such as a computer monitor, a flat-panel display, a digital projector, a printer, or other type of output device. It will be appreciated that the server computer 600 might not include all of the components shown in FIG. 6, can include other components that are not explicitly shown in FIG. 6, or might utilize an architecture completely different than that shown in FIG. 6.

Figure 7:
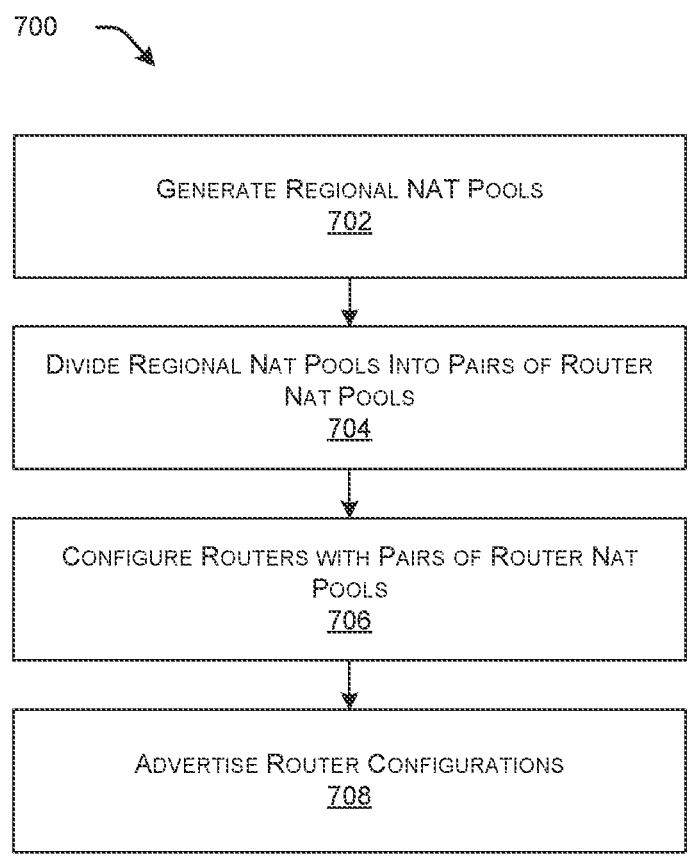
FIG. 7 is a flow diagram that illustrates an example method performed by a manager such as introduced in FIG. 3, in accordance with various aspects of the technologies disclosed herein.
Figure 8:
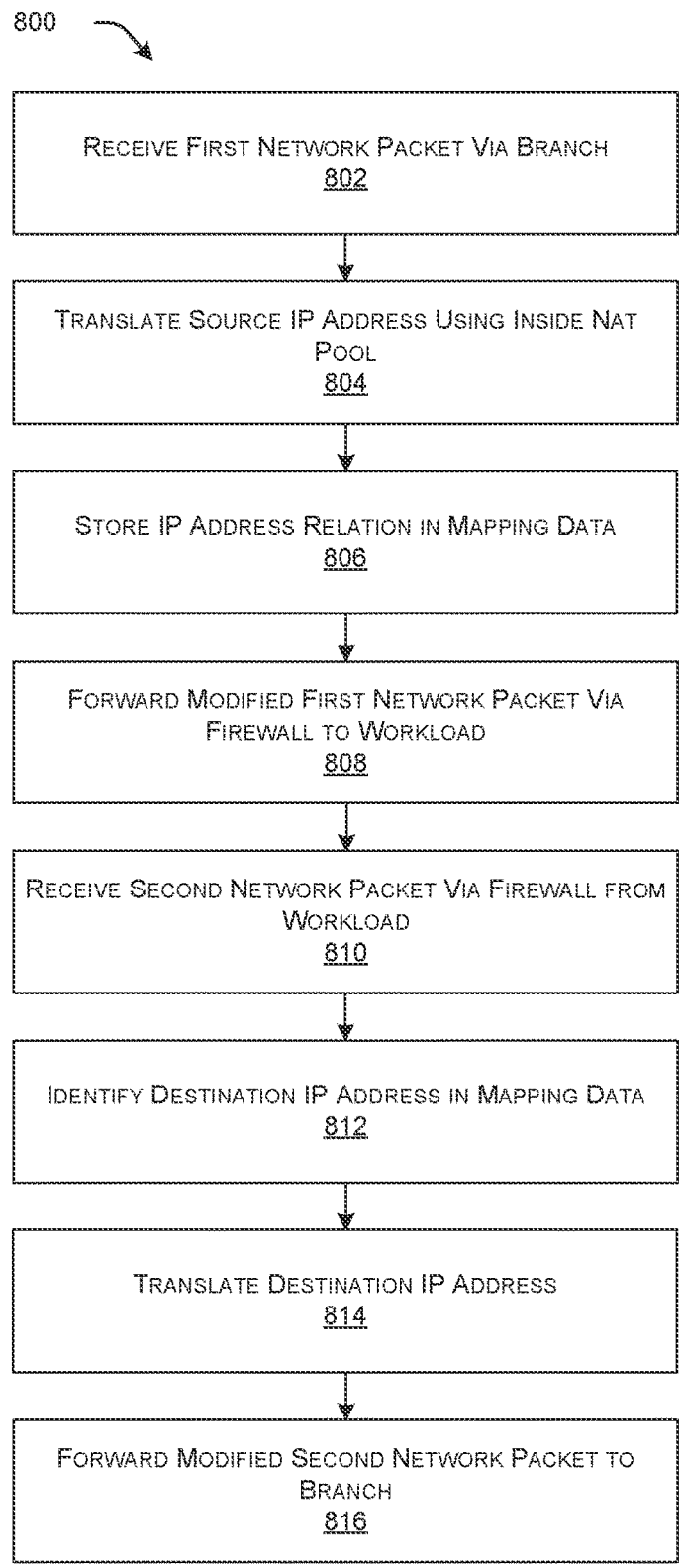
FIG. 8 is a flow diagram that illustrates an example method performed by a router, in accordance with various aspects of the technologies disclosed herein.

FIGS. 7-8 illustrate flow diagrams of example methods 700, 800 performed at least partly by a manager 300 and a router 200, respectively. The logical operations described herein with respect to FIGS. 7-8 may be implemented (1) as a sequence of computer-implemented acts or program modules running on a computing system and/or (2) as interconnected machine logic circuits or circuit modules within the computing system. In some examples, the methods 700, 800 may be performed by a system comprising one or more processors and one or more non-transitory computer-readable media storing computer-executable instructions that, when executed by the one or more processors, cause the one or more processors to perform the methods 700, 800.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 7-8 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

FIG. 7 is a flow diagram that illustrates an example method performed by a manager 115 introduced in FIG. 1, or manager 300 introduced in FIG. 3, in accordance with various aspects of the technologies disclosed herein. The illustrated operations can be performed in a set up stage, in order to configure gateway routers such as 122, 142 according to this disclosure. After they are set up, the routers 122, 142 can be configured to perform methods according to FIG. 8.

At operation 702, a manager 300 can generate regional NAT pools. For example, the manager 300 can divide IP addresses 320 in order to generate multiple different regional NAT pools 330, 340, 350, wherein each of the multiple different regional NAT pools 330, 340, 350 comprises a different regional group of unique IP addresses associated with a different geographic region such as region A 360, region B 370, or region C 380.

At operation 704, the manager 300 can divide each of the multiple different regional NAT pools 330, 340, 350 into multiple distinct pairs of router NAT pools. For example, the regional NAT pool 330 can be divided into NAT pool pairs 332 and 334, the regional NAT pool 340 can be divided into NAT pool pairs 342 and 344, and the regional NAT pool 350 can be divided into NAT pool pairs 352 and 354.

Each distinct pair of router NAT pools of the multiple distinct router NAT pool pairs 332, 334, 342, 344, 352, and 354 can comprise an inside pool and an outside pool. The inside pool can be designated for use in connection with network traffic that is originated outside the cloud 110 and is bound for an inside destination, such as the workload 162, that is inside the cloud 110. The outside pool can be designated for use in connection with network traffic that is originated inside the cloud 110 and is bound for an outside destination, such as branch 180, that is outside the cloud 110.

At operation 706, the manager 300 can configure different routers 362, 364, 372, 374, 382, 384 with different distinct pairs of router NAT pools from the multiple distinct router NAT pool pairs 332, 334, 342, 344, 352, and 354. Routers of a geographic region can be configured with distinct pairs of router NAT pools that are associated with the geographic region. For example, routers 362, 364 of geographic region A 360 can be configured with router NAT pools of NAT pool pairs 332 and 334, respectively, that are associated with the geographic region A 360.

At operation 708, the manager 300 can advertise, e.g., by sending information within the cloud 110 and/or to the branches 180, 190, the different routers configured with the different distinct pairs of router NAT pools. For example, the manager 300 can use a border gateway protocol (BGP) to advertise the IP addresses in use by the routers 362, 364, 372, 374, 382, 384 because of the NAT pool assignments according to operation 706.

FIG. 8 is a flow diagram that illustrates an example method performed by a router 122 introduced in FIG. 1, or a router 200 introduced in FIG. 2A and 2B, in accordance with various aspects of the technologies disclosed herein. The router 200 can comprise a virtual hub router, and the cloud workload 162 can comprise a virtual network cloud workload. The illustrated operations can be performed by the router 200 after router 200 set-up according to FIG. 7.

For example, prior to conducting the method 800, a router 200 can receive a first, inside NAT pool 202 and a second, outside NAT pool 204 from a cloud manager 115 associated with the cloud 110. The inside NAT pool 202 can comprise a first group of IP addresses, and the outside NAT pool 204 can comprise a second, different group of IP addresses. The inside NAT pool 202 and the outside NAT pool 204 may be associated with a region of the cloud 110, the region comprising the router 200. The inside NAT pool 202 and the outside NAT pool 204 can comprise unique NAT pools that are different from other NAT pools assigned to other routers associated with the cloud 110, as described in connection with FIG. 3. The router 200 or the manager 115 can be configured to advertise, e.g., via BGP, an association between the router 200 and the IP addresses of the inside NAT pool 202 and the outside NAT pool 204.

At operation 802, a router 200 associated with a cloud 110 can receive a first network packet 210A via a branch device such as branch 180. The branch 180 is external to the cloud 110 as illustrated in FIG. 1, and the first network packet 210A can comprise a first destination IP address 214 and a first source IP address 212. In some embodiments, the first network packet 210A can be received a SDWAN tunnel 184.

At operation 804, the router 200 can translate the source IP address 212 using the inside NAT pool 202. Operation 804 can comprise, e.g., selecting a second source IP address 202A from the inside NAT pool 202, wherein the inside NAT pool 202 comprises a group of IP addresses 202A, 202B, 202C. Operation 804 can further comprise inserting, by the router 200, the second source IP address 202A into the first network packet 210A as an updated first network packet 210A source IP address, resulting in a modified first network packet 210B.

At operation 806, the router 200 can store a mapping data structure or other mapping data 208 comprising a relation between the second source IP address 202A and the first source IP address 212. At operation 808, the router 200 can forward the modified first network packet 210B via a firewall 124 to a cloud workload 162 associated with the cloud 110.

Operations 810-816 pertain to processing of return traffic by the router 200. At operation 810, the router 200 can receive a second network packet 220A via the firewall 124 and from the cloud workload 162, wherein the second network packet 220A comprises a third source IP address 214 associated with the cloud workload 162, and a second destination IP address 202A, wherein the second destination IP address 202A matches the second source IP address 212. Furthermore, in this example, the third source IP address 214 is the same as the destination IP address 214 and so both are labeled as 214.

At operation 812, the router 200 can identify whether the destination IP address 202A is included in the mapping data 208. In some embodiments, the router 200 can check the mapping data 208 to determine whether the destination IP address 202A is referenced therein. In other embodiments, the router 200 can compare the second destination IP address 202A with the group of IP addresses 202A, 202B, 202C included in the inside NAT pool 202, and the router 200 can use the mapping data 208 and the second destination IP address 202A to identify the first source IP address 212 in response to the second destination IP address 202A matching an IP address 202A included in the inside NAT pool 202.

At 814, the router 200 can translate the second destination IP address 202A. For example, the router 200 can use the mapping data 208 and the second destination IP address 214 to identify the first source IP address 212. The router 200 can insert the first source IP address 212 into the second network packet 220A as an updated second network packet destination address, resulting in a modified second network packet 220B.

At operation 816, the router 200 can forward the modified second network packet 220B via the branch 180 and towards the updated second network packet destination IP address 212. In some embodiments, the branch 180 itself may be the destination associated with the destination IP address 212. In other embodiments, the branch 180 may be connected to downstream networks, such as local area networks (LANs) which include devices associated with the destination IP address 212. Forwarding the modified second network packet 220B via the branch 180 and towards the updated second network packet destination address can comprise forwarding the modified second network packet 220B via the SDWAN tunnel 184.

The operations 802-816 can be adapted to process network traffic that is originated at a cloud workload 162, as explained in connection with FIG. 2B. For example, a third network packet can be received from the cloud workload 162 at operation 802, the third network packet comprising a fourth source IP address. At operation 804, the router 200 can use the second, outside NAT pool 204 to translate the fourth source IP address, by inserting an IP address from the outside NAT pool 204. The router 200 can be configured to similarly perform modified versions of the other operations 806-816 on the network traffic that is originated at a cloud workload 162.

In some implementations according to FIG. 8, at 802, network traffic from branches 180, 190 can land on a cloud gateway router such as router 200, on a service such as VPN/VRF. At 808, the network traffic can egress from the cloud gateway router 200 on a VRF with an inside NAT pool 202 IP address, using inside to outside translation. The network traffic can be processed by a firewall 124 at the local gateway hub 120, and the network traffic can be sent to the destination workload 162 using a NAT IP address.

The workload 162 at the destination virtual network 160 processes the network traffic and returns back a syn-ack and/or subsequent network packets for the traffic flow to the router 200 that had inserted the NAT IP address. The return traffic is received by a SDWAN gateway router, such as router 200, on service side and the traffic is sent back to the branch 180. Any acknowledgement (ACK) packets and subsequent data packets from the branch 180 will have flow stickiness and go back to same router 200.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
    generating, by a cloud manager associated with a cloud, multiple different regional network address translation pools, wherein each of the multiple different regional network address translation pools comprises a different regional group of unique internet protocol addresses associated with a different geographic region;
    dividing, by the cloud manager, each of the multiple different regional network address translation pools into multiple distinct pairs of router network address translation pools,
    wherein each distinct pair of router network address translation pools of the multiple distinct pairs of router network address translation pools comprises an inside pool and an outside pool,
    wherein the inside pool is designated for use in connection with network traffic that is originated outside the cloud and is bound for an inside destination that is inside the cloud, and
    wherein the outside pool is designated for use in connection with network traffic that is originated inside the cloud and is bound for an outside destination that is outside the cloud;
    configuring, by the cloud manager, different routers with different distinct pairs of router network address translation pools from the multiple distinct pairs of router network address translation pools,
    wherein routers of a geographic region are configured with distinct pairs of router network address translation pools that are associated with the geographic region; and
    using a border gateway protocol to advertise the different routers configured with the different distinct pairs of router network address translation pools.

2. The method of claim 1, wherein the cloud manager comprises a network hierarchy manager.

3. The method of claim 1, wherein the different routers comprise virtual hub routers.

4. The method of claim 1, wherein the different routers comprise gateway routers configured to process network traffic entering or leaving the cloud.

5. The method of claim 1, wherein the different routers comprise gateway routers configured to process network traffic that enters or leaves the cloud.

6. The method of claim 1, wherein a respective router of the different routers is configured to:
    receive a first network packet via a branch device, wherein the branch device is external to the cloud and wherein the first network packet comprises a first destination internet protocol address and a first source internet protocol address;
    select a second source internet protocol address from a first network address translation pool of a respective pair of router network address translation pools configured at the respective router;
    insert the second source internet protocol address into the first network packet as an updated first network packet source internet protocol address, resulting in a modified first network packet;
    store a mapping data structure comprising a relation between the second source internet protocol address and the first source internet protocol address; and
    forward the modified first network packet via a firewall to a cloud workload associated with the cloud.

7. The method of claim 6, wherein the respective router of the different routers is configured to:
    receive a second network packet via the firewall and from the cloud workload, wherein the second network packet comprises a third source internet protocol address associated with the cloud workload, and a second destination internet protocol address, wherein the second destination internet protocol address matches the second source internet protocol address;
    use the mapping data structure and the second destination internet protocol address to identify the first source internet protocol address;
    insert the first source internet protocol address into the second network packet as an updated second network packet destination address, resulting in a modified second network packet; and
    forward the modified second network packet via the branch device and towards the updated second network packet destination address.

8. A computing device associated with a cloud, the computing device comprising:
    one or more processors; and
    one or more computer-readable media storing computer-executable instructions that, when executed by the one or more processors, cause the one or more processors to perform operations comprising:
    generating, by a cloud manager associated with the cloud, multiple different regional network address translation pools, wherein each of the multiple different regional network address translation pools comprises a different regional group of unique internet protocol addresses associated with a different geographic region;
    dividing, by the cloud manager, each of the multiple different regional network address translation pools into multiple distinct pairs of router network address translation pools,
    wherein each distinct pair of router network address translation pools of the multiple distinct pairs of router network address translation pools comprises an inside pool and an outside pool,
    wherein the inside pool is designated for use in connection with network traffic that is originated outside the cloud and is bound for an inside destination that is inside the cloud, and
    wherein the outside pool is designated for use in connection with network traffic that is originated inside the cloud and is bound for an outside destination that is outside the cloud;
    configuring, by the cloud manager, different routers with different distinct pairs of router network address translation pools from the multiple distinct pairs of router network address translation pools,
    wherein routers of a geographic region are configured with distinct pairs of router network address translation pools that are associated with the geographic region; and
    using a border gateway protocol to advertise the different routers configured with the different distinct pairs of router network address translation pools.

9. The computing device of claim 8, wherein the cloud manager comprises a network hierarchy manager.

10. The computing device of claim 8, wherein the different routers comprise virtual hub routers.

11. The computing device of claim 8, wherein the different routers comprise gateway routers configured to process network traffic entering or leaving the cloud.

12. The computing device of claim 8, wherein the different routers comprise gateway routers configured to process network traffic that enters or leaves the cloud.

13. The computing device of claim 8, wherein a respective router of the different routers is configured to:
receive a first network packet via a branch device, wherein the branch device is external to the cloud and wherein the first network packet comprises a first destination internet protocol address and a first source internet protocol address;
select a second source internet protocol address from a first network address translation pool of a respective pair of router network address translation pools configured at the respective router;
insert the second source internet protocol address into the first network packet as an updated first network packet source internet protocol address, resulting in a modified first network packet;
store a mapping data structure comprising a relation between the second source internet protocol address and the first source internet protocol address; and
forward the modified first network packet via a firewall to a cloud workload associated with the cloud.

14. The computing device of claim 13, wherein the respective router of the different routers is configured to:
receive a second network packet via the firewall and from the cloud workload, wherein the second network packet comprises a third source internet protocol address associated with the cloud workload, and a second destination internet protocol address, wherein the second destination internet protocol address matches the second source internet protocol address;
use the mapping data structure and the second destination internet protocol address to identify the first source internet protocol address;
insert the first source internet protocol address into the second network packet as an updated second network packet destination address, resulting in a modified second network packet; and
forward the modified second network packet via the branch device and towards the updated second network packet destination address.

15. A method comprising:
generating multiple different network address translation pools, wherein each of the multiple different network address translation pools comprises a different group of unique internet protocol addresses;
dividing each of the multiple different network address translation pools into multiple distinct pairs of router network address translation pools,
wherein each distinct pair of router network address translation pools of the multiple distinct pairs of router network address translation pools comprises an inside pool and an outside pool,
wherein the inside pool is designated for use in connection with network traffic that is originated outside a cloud and is bound for an inside destination that is inside the cloud, and
wherein the outside pool is designated for use in connection with network traffic that is originated inside the cloud and is bound for an outside destination that is outside the cloud;
configuring at least one router with a distinct pair of router network address translation pools from the multiple distinct pairs of router network address translation pools; and
using a border gateway protocol to advertise the at least one router configured with the distinct pair of router network address translation pools.

16. The method of claim 15, wherein the multiple different regional network address translation pools are regional network address translation pools comprising regional groups of unique internet protocol addresses associated with different geographic regions.

17. The method of claim 16, wherein the at least one router is associated with a geographic region and wherein configuring the at least one router with the distinct pair of router network address translation pools comprises configuring the at least one router with the distinct pair of router network address translation pools that is associated with the geographic region.

* * * * *